Patented Feb. 23, 1954

2,670,331

UNITED STATES PATENT OFFICE 2,670,331

MAGNESIUM-ZINC CERAMIC FERRITE CONTAINING COPPER

Ernst Albers-Schoenberg, Metuchen, N. J., assignor to Steatite Research Corporation, Keasbey, N. J., a corporation of Delaware No Drawing. Application September 28, 1951, Serial No. 248,889

6 Claims. (Cl. 252—62.5)

This invention relates to a magnetically strong ferromagnetic ceramic material consisting primarily of the magnesium zinc type of ferrite.

The ferrites comprise a group of crystal type compounds of the general formula $X(M''O) \cdot Y(Fe_2O_3)$ in which $M''O$ stands for one or several bivalent metal oxides and in which $X:Y$ is approximately 1:1. Most of these compounds have a spinel structure and ferromagnetic properties. When $M''O$ is ferrous oxide the ferrite is called magnetite ($Fe_3O_4$). Most of the ferrites which have a high permeability contain an essential proportion of nickel oxide as one of the bivalent metal oxides. Nickel oxide is expensive and restricted in war time so that it would be an advantage to produce a ferrite with high permeability properties without the addition of any great amount of nickel oxide.

One way of avoiding the use of nickel is its replacement by manganese. Manganese-zinc ferrites exhibit excellent properties. But these bodies have to be fired in a strictly controlled neutral atmosphere, a procedure not quite easy to carry out especially when large quantities of magnetic cores have to be handled. Manganese, on the other hand, is not too plentiful either.

The ferrites made from the bivalent oxides of magnesium and zinc offer the advantage that these materials are easily available and that the magnesium-zinc ferrites do not require firing in a protective atmosphere, i. e., no special precautions need to be taken to include protective gases nor to exclude atmospheric air during the firing, cooling or other heat treatment of these ferrites. However, there is a disadvantage too: the magnesium-zinc ferrites are magnetically not very strong.

This invention is based on the discovery that the permeability and other magnetic properties of the magnesium-zinc ferrites can be considerably improved by the addition of a small amount of cupric oxide without destroying the other advantages of the magnesium zinc ferrites.

An object of the invention therefore is to provide a magnesium-zinc type of ferrite with strong magnetic properties.

Another object of the invention is to provide a ferro-magnetic magnesium zinc ferrite with strong magnetic properties that can be fired and otherwise treated without a protective atmosphere.

These objects and others ancillary thereto are obtained by adding a small proportion of cupric oxide to a ferrite in which the bivalent oxides are primarily magnesium and zinc oxides.

The copper oxide (CuO) is added in the proportion of 1.5–8% by weight, preferably in the proportion of 2 to 5% by weight. The copper oxide (CuO) may be added as such to the raw composition but a very satisfactory way of adding it is in the form of the basic copper carbonate.

The incorporation of small amounts of lithium oxide which may be added in the form of lithium carbonate facilitates the reaction and improves the magnetic properties.

The zinc and magnesium oxides may be added in approximately equal molar proportions but this is not necessary as the mol proportion of $ZnO:MgO$ may vary somewhat, from 3:4 to 4:3. The total mol proportion of the bivalent oxides is approximately equal to the mol proportion of $Fe_2O_3$ but can vary from 1:.9 to 1:1.1. The invention, both as to its organization and its method of operation, together with additional objects and advantages thereof, will best be understood from the following description of specific embodiments when read in connection with the accompanying examples.

EXAMPLE 1

A. A mix consisting of 8 weight per cent of MgO, 18 weight per cent of ZnO and 74 weight per cent of $Fe_2O_3$ is wet-ballmilled for 15 hours, then dried and pulverized. After adding 6% of water ring samples are pressed, which are subjected to the firing at 2400° F. under the free access of air. The magnetic properties measured are found in the following table under A.

B. A mix consisting of 7.5 weight per cent of MgO, 16.5 weight per cent of ZnO, 73 weight per cent of $Fe_2O_3$ and 3 weight per cent of basic copper carbonate ($Cu(OH)_2 \cdot 2CuCO_3$) was wet ballmilled for 15 hours, then dried and pulverized. After adding 6% of water ring samples were pressed, which were subjected to the same firing as described in Example 1A. The magnetic properties measured are found in the following table under B.

| | A | B |
|---|---|---|
| $\mu_0$, initial permeability | 360 | 425 |
| $\mu_{max}$, maximum permeability | 770 | 1,660 |
| $B_s$, saturation flux density (gauss) | 2,500 | 2,900 |

EXAMPLE 2

C. A mix consisting of 7 weight per cent of MgO, 3.5% of lithium carbonate, $Li_2CO_3$, 17% of ZnO and 72% of $Fe_2O_3$ was wet ballmilled for 15 hours, dried and pulverized. After adding 6% of water, ring samples were pressed and subjected to a firing at 2300° F. under free access of air. The magnetic properties measured are found in the following table under C.

D. A mix consisting of 7 weight per cent of MgO, 2% of lithium carbonate, $Li_2CO_3$, 17% of zinc oxide, 3% of basic copper carbonate $(Cu(OH)_2.2CuCO_3)$ and 71% of $Fe_2O_3$ was wet-ballmilled for 15 hours, then dried and pulverized. After adding 6% of water, ring samples were pressed and subjected to the same firing as described in Example 2C. The magnetic properties measured are found in the following table under D.

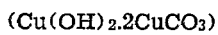

|  | C | D |
|---|---|---|
| $\mu_0$, initial permeability | 425 | 590 |
| $\mu_{max}$, maximum permeability | 1,350 | 2,450 |
| $B_s$, saturation flux density | 3,000 | 3,020 |

The second example differs from the first inasmuch as there is some lithium oxide present as an ingredient of the body. Lithium oxide facilitates the reaction of the bivalent oxides and iron oxide, forming a ferrite itself. But although the lithium oxide content of 2D is smaller than that of 2C, 2D proves the stronger material due to the addition of the copper compound.

Bodies featuring these properties are especially valuable for the use as inductance and transformer cores in the lower hand of high frequencies as between about 10 and 100 kilocycles.

The described method of adding copper is not limited to pure magnesium-zinc-ferrites. In cases where the use of nickel oxide is not objectionable a magnesium-nickel-zinc-copper-ferrite is very satisfactory. It goes without saying, that the magnetic performance of a nickel containing body is superior to that of a nickel free one. The copper addition, however, offers considerable help raising the qualities of a nickel-free magnesium-zinc ferrite up to a standard where its usefulness for many technical purposes is granted. The improvement effect of the copper addition is always noted: in nickel-zinc ferrites, magnesium-zinc ferrites and magnesium-nickel-zinc ferrites. In my application Serial No. 189,056, filed October 7, 1950, disclosing a nickel-zinc ferrite, an addition of 1.25-7%, by weight of copper oxide is employed. For the magnesium zinc ferrites the proportion of copper oxide should be from 1.5 to 8% by weight of the ferrite composition, preferably between 2 and 5%. With respect to the higher percentages of copper oxide (5 to 8%), the bodies described probably should not be looked at as magnesium-zinc ferrites with some copper oxide added as a kind of catalyst, but rather as triple ferrites of the system $MgO—Zn—CuO—Fe_2O_3$

I claim:

1. A ferromagnetic body of high permeability properties consisting primarily of the components ZnO, MgO and $Fe_2O_3$ the ratio of the total mol proportion of ZnO and MgO to $Fe_2O_3$ being between 1:.9 and 1:1.1, the mol proportion of ZnO:MgO being from 3:4 to 4:3 and containing in addition from 1.5 to 8% by weight of copper oxide, and from 0 to 2% by weight of lithium oxide.

2. A ferromagnetic body of high permeability properties consisting primarily of the components ZnO, MgO and $Fe_2O_3$ the ratio of the total mol proportion of ZnO and MgO to $Fe_2O_3$ being between 1:.9 and 1:1.1, the mol proportion of ZnO:MgO being from 3:4 to 4:3 and containing in addition from 1.5 to 8% by weight of copper oxide.

3. A ferromagnetic body of high permeability properties consisting primarily of the components ZnO, MgO and $Fe_2O_3$ the ratio of the total mol proportion of ZnO and MgO to $Fe_2O_3$ being between 1:.9 and 1:1.1, the mol proportion of ZnO:MgO being from 3:4 to 4:3 and containing in addition from 1.5 to 8% by weight of copper oxide and from .2 to 2% by weight of lithium oxide.

4. A process of making a ferromagnetic mixed ferrite consisting primarily of the components ZnO, MgO and $Fe_2O_3$ the ratio of the total mol proportion of ZnO and MgO to $Fe_2O_3$ being between 1:.9 and 1:1.1, the mol proportion of ZnO:MgO being from 3:4 to 4:3 comprising the steps of mixing the metal oxides in the required proportions, adding a cupric oxide producing ingredient in amounts to give a cupric oxide content of 1.5 to 8% by weight of the composition, forming the composition to shape and firing the shaped product under free access of air without providing a protective atmosphere.

5. A process of making a ferromagnetic mixed ferrite consisting primarily of the components ZnO, MgO and $Fe_2O_3$ the ratio of the total mol proportion of ZnO and MgO to $Fe_2O_3$ being between 1:.9 and 1:1.1, the mol proportion of ZnO:MgO being from 3:4 to 4:3 comprising the steps of mixing the metal oxides in the required proportions, adding basic copper carbonate in amounts to give a cupric oxide content of 1.5 to 8% by weight of the composition, thereafter molding and firing the composition under free access of air without providing a protective atmosphere.

6. A ferromagnetic ceramic core for inductances and transformers especially suitable for the frequency band of 10 to 100 kilocycles consisting of a triple ferrite of the oxide system $MgO—ZnO—CuO—Fe_2O_3$, the mol proportion of bivalent magnesium and zinc oxides to ferric oxide being from 1:.9 to 1:1.1, the amount of copper oxide being from 1.5 to 8% by weight of the composition and the mol proportion of ZnO:MgO being from 3:4 to 4:3.

ERNST ALBERS-SCHOENBERG.

References Cited in the file of this patent

UNITED STATES PATENTS

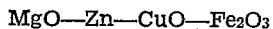

| Number | Name | Date |
|---|---|---|
| 2,565,053 | Albers-Schoenberg | Aug. 21, 1951 |
| 2,565,111 | Albers-Schoenberg | Aug. 21, 1951 |
| 2,565,861 | Leverenz et al. | Aug. 28, 1951 |

OTHER REFERENCES

"New Developments in Ferromagnetic Materials," Snoek (1947), Elsevier Pub. Co., Inc., page 69.